United States Patent [19]
Abboud

[11] Patent Number: 5,939,629
[45] Date of Patent: Aug. 17, 1999

[54] ROTOR BALANCING SYSTEMS INCLUDING SUPERCONDUCTOR BEARINGS

[75] Inventor: Robert G. Abboud, Barrington Hills, Ill.

[73] Assignee: Commonwealth Research Corporation, Chicago, Ill.

[21] Appl. No.: 09/032,253

[22] Filed: Feb. 27, 1998

[51] Int. Cl.[6] .................................................. G01M 1/04
[52] U.S. Cl. ........................................... 73/480; 505/842
[58] Field of Search .............................. 73/480, 481, 482, 73/483, 486, 459; 505/160, 700, 842; 310/90.5

[56] References Cited

U.S. PATENT DOCUMENTS

| | | | |
|---|---|---|---|
| 3,581,576 | 6/1971 | Reiser | 73/459 |
| 3,629,753 | 12/1971 | Kawabe et al. | 310/90.5 |
| 4,886,778 | 12/1989 | Moon et al. | 505/166 |
| 4,981,043 | 1/1991 | Okumura | 73/462 |
| 5,084,643 | 1/1992 | Chen | 310/90.5 |
| 5,120,706 | 6/1992 | Weeks, II | 505/166 |
| 5,463,900 | 11/1995 | Schierling et al. | 73/469 |
| 5,747,426 | 5/1998 | Abboud | 505/166 |

OTHER PUBLICATIONS

*Dynamic Balancing*, IRD Mechanalysis, Inc., Application Report No. 111, 1977, pp. 1–32.
*Dynamic Balancing*, IRD Mechanalysis, Inc., Technical Paper No. 116, 1981, pp. 1–32.

*Primary Examiner*—John E. Chapman
*Attorney, Agent, or Firm*—Brinks Hofer Gilson & Lione

[57] ABSTRACT

A method and system for balancing a rotary member. The system preferably comprises balancer stand, a stator element including and a levitation element. The rotary member is coupled with the levitation element. The rotary member and the levitation element are positioned above the stator element which preferably comprises a superconductor element. The rotary member and levitation element are suspended above the stator element when the superconductor element is activated through field cooling. The rotary member is titled with respect to a direction of gravity such that an imbalanced portion of the rotary member rests at the lowest point of the rotary member. The imbalanced portion is thereby identified and can be corrected.

28 Claims, 3 Drawing Sheets

ROTOR BALANCING SYSTEMS INCLUDING SUPERCONDUCTOR BEARINGS

BACKGROUND

The present invention relates to balancing systems and more specifically to rotor balancing.

High-speed rotor systems such as those used in flywheel energy systems usually operate in a vacuum environment at a rotation speeds of about 1,000 meters per second. The coefficient of friction of such a passive bearing system is typically extremely low, with a value of about $3\times10^{-7}$. Accordingly, the rotational efficiency of the rotor is especially sensitive to small amounts of imbalance. Therefore, a precisely balanced rotor is critical to efficient operation.

Static balancing and dynamic balancing are two general approaches that can be used to balance a rotary member. Static balancing is generally used to identify imbalance moments along one axis of the rotor element. Static balancing is generally performed by putting the geometric center of the element on either a gimbal mount or a rotational mount. Both the gimbal mount and the rotational mount typically comprise a mechanical bearing as known by those skilled in the art. Gravity will typically cause the element to move in one or more directions. The direction that the component moves indicates the imbalance moment. This imbalance moment can be compensated by making a small change in mass opposite to the imbalance location to introduce an equal and opposing moment.

When a gimbal mount is used, the geometric center of the element being balanced is placed on the mount which typically comprises a fulcrum or similar device. An imbalance moment on the element provides a torque that tips the imbalanced portion of the element downward. A gimbal mount thus allows the element to move in two dimensions. When a rotational mount is used, the element is tilted at an angle with respect to the direction of gravity such that an imbalance moment causes the imbalanced portion of the element to rotate to the lowest point of the tilt. Thus, a rotational mount allows the element to move in one dimension.

In both static and dynamic balancing, the ability to detect imbalance is limited by the amount of friction in the bearing. The friction in the bearing can create torques that may offset any imbalance moment that is smaller than the friction torque. Such friction may prevent the detection of small degrees of imbalance. Accordingly, as the friction in a bearing increases, the sensitivity of the balancing system decreases. Therefore, it is desirable to limit the amount of friction present in balancing system bearings.

SUMMARY OF THE INVENTION

The present invention relates to a method and system for identifying and locating imbalance in a rotary member through the use of superconductor bearings. The method of the present invention utilizes a high-temperature superconductor bearing that preferably comprises superconductor material having high stiffness through a rotating plane to support rotary members.

Preferred embodiments of the present invention detect small amounts of imbalance that can be present in a high speed rotor operating in an ultra-low friction environment such as in vacuum. In addition, the preferred method of the present invention allows for a rotary member to be balanced in its normal operating environment or in a dedicated balancing system. Furthermore, the preferred embodiments of the present invention reduce the cost of balancing a rotary member in several ways including eliminating the need for dynamic balancing in some applications.

The invention will best be understood by reference to the following detailed description, taken in conjunction with the accompanying drawings.

DESCRIPTION OF THE PREFERRED EMBODIMENTS

Figure 1:
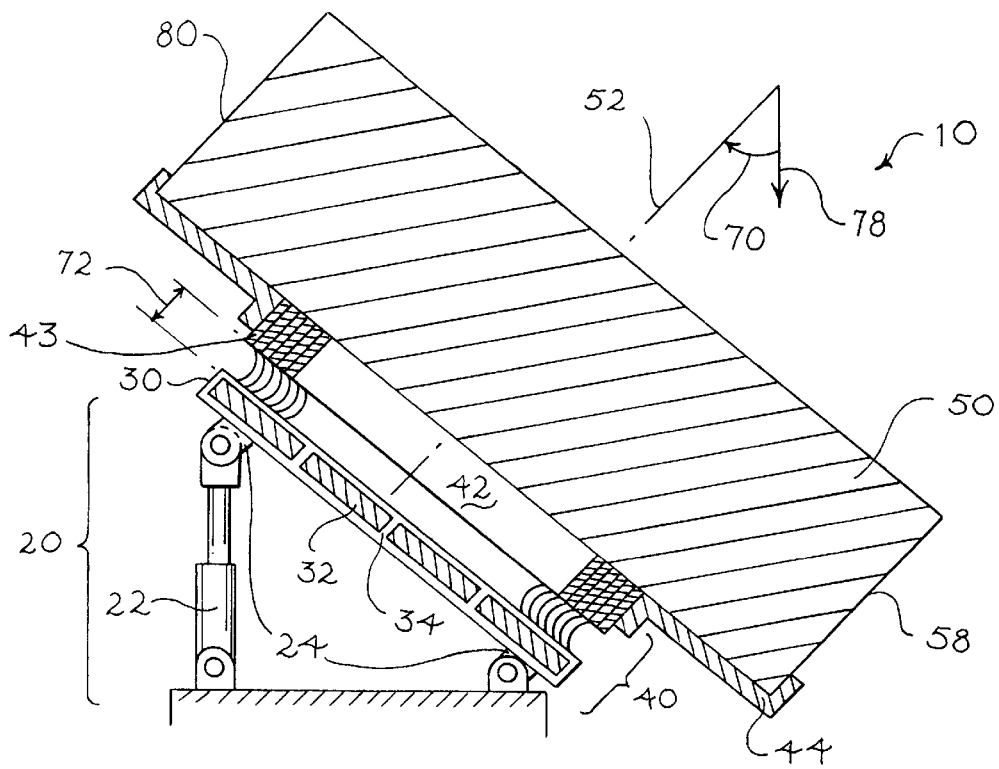
FIG. 1 shows a cross-sectional view of a balancing system of a preferred embodiment.
Figure 2:
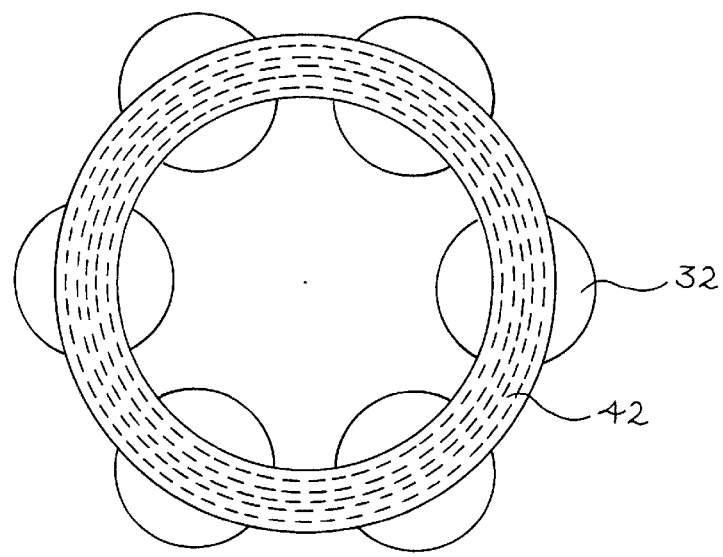
FIG. 2 shows a top view of the superconductor and magnet elements of FIG. 1.

FIGS. 1 and 2 show a balancing system 10 of a preferred embodiment. As best seen in FIG. 1, balancing system 10 includes a balancer stand 20, a superconductor bearing 40 and a rotary member 50. The balancer stand 20 preferably comprises a vertically adjustable leg 22 and a bearing support 24. The balancer stand 20 allows the superconductor bearing 40 to be positioned in a variety of orientations. According to an alternate embodiment, balancer stand 20 can comprise any type of mechanical, electrical, hydraulic or magnet mechanism configured to dispose rotary element 50 such that rotation axis 52 is non-parallel with the direction of gravity 78.

The superconductor bearing 40 preferably comprises a stator element 30 and a levitating element 42. The stator element 30 preferably comprises a plurality of superconductor elements 32. Superconductor elements 32 preferably comprise a high-temperature superconductor material and more preferably comprise a Type II superconductor material as described herein and known by those skilled in the art.

Superconductor elements 32 are preferably housed in a cooling chamber 34 that is maintained at the operating temperature of the superconductor elements 32 and enables the activation of superconductor elements 32. Activation of superconductor elements 32 energizes the superconductor elements 32 such that a magnet may be levitated above the superconductor elements 32 as known by those skilled in the art. Superconductor elements 32 preferably comprise circular pucks as depicted in FIG. 2. Alternatively, superconductor elements 32 can comprise any size or shaped superconductor elements or any other suitable superconductor elements as known by those skilled in the art.

The levitating element 42 preferably comprises a plurality of magnet elements 43 as depicted in FIG. 2. The magnet elements 43 preferably comprise a plurality of concentrically disposed permanent magnet rings. Alternatively, the magnetic elements 43 can comprise any suitable magnetic element adapted for use in the present embodiments as known by those skilled in the art.

The rotary member 50 preferably has a rotation axis 52 through which the balancing is performed. Rotary member 50 is preferably coupled with superconductor bearing 40 through the use of a bracket 44 that supports the rotary member 50. As used herein, the term "coupled with" means coupled either directly or indirectly via one or more intervening elements. Bracket 44 preferably aligns the rotation axis 52 such that it is concentric with a rotation axis of superconductor bearing 40 to ensure that the rotary member rotates about rotation axis 52. The rotation axis of superconductor bearing 40 is preferably defined by the center of flux of the levitating member 42. Rotary member 50 is preferably oriented such that the rotation axis is non-parallel with the direction of gravity 78.

The orientation of rotary member 50 can preferably be altered through the use of balancer stand 20. While the rotation axis 52 is preferably nearly perpendicular with respect to the stator element 30, as depicted in FIG. 1, the rotation axis 52 can alternatively be non-perpendicular with respect to the stator element 30. This is particularly useful in the case where it may be impractical to alter the position of the stator element 30.

According to an alternate embodiment, stator element 30 can comprise at least one magnet element as described herein and levitation element 42 can comprise a superconductor element as described herein. While the system depicted in FIG. 1 includes a single superconductor bearing 40, it is to be understood that a plurality of superconductor bearings 40 can be utilized in an alternate embodiment.

Figure 3:
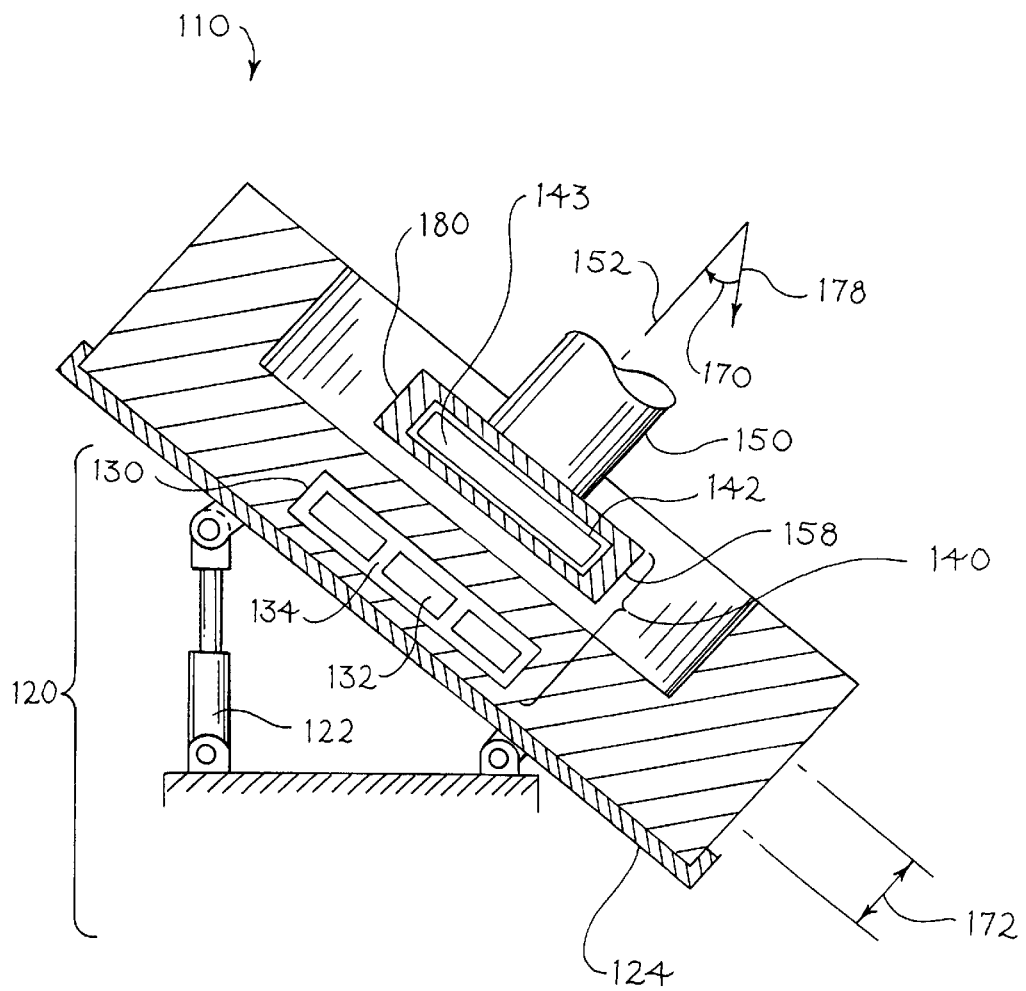
FIG. 3 shows a cross-sectional view of a rotary member being balanced in its operating environment in accordance to the present invention.

FIG. 3 shows a portion of a flywheel system 110 wherein the rotary member 150 can be balanced in accordance with the preferred method. One advantage of this system is the ability to balance the rotary member 150 through the same rotation axis 152 as that used during operation. Flywheel system 110 comprises an apparatus support 120, a superconductor bearing 140 and a rotary member 150. The apparatus support 120 preferably comprises a bracket 124 and a vertically adjustable leg 122. The apparatus support 120 enables the flywheel system 110 to be tilted to a tilt angle 170. The tilt angle 170 preferably comprises the angle between rotation axis 152 relative to the direction of gravity 178. Tilting the system 110 allows an imbalanced portion 158 of the rotary member 150 to rest at the lowest point of the system, as a result of gravity acting upon the rotary member 150. The imbalanced portion 158 can be compensated at the balance compensation portion 180, which is preferably directly opposite the imbalanced portion 158 as described herein. According to an alternate embodiment, apparatus support 120 can comprise any type of mechanical, electrical, hydraulic or magnet mechanism configured to dispose rotary element 150 such that rotation axis 152 is non-parallel with the a direction of gravity 178.

The superconductor bearing 140 preferably comprises a stator element 130 and a levitating element 142. The stator element 130 preferably comprises a plurality of superconductor elements 132 housed in a cooling chamber 134. The superconductor elements 132 preferably comprise a high-temperature superconductor material and more preferably comprise a Type II superconductor material as described herein and known by those skilled in the art.

The levitation element 142 preferably comprises a permanent magnet 143. Alternatively, the levitation element 142 can comprise any form of permanent magnet adapted for use in the present embodiment as known by those skilled in the art.

Rotary member 150 preferably has a rotational axis 152 and is preferably coupled with the superconductor bearing 140. Rotary member 150 can preferably be oriented such that rotation axis 152 is non-parallel with the direction of gravity 178. While the rotation axis 152 is preferably nearly perpendicular with respect to the stator element 130, as depicted in FIG. 2, the rotation axis 152 can alternatively be non-perpendicular or parallel with respect to stator element 130.

Figure 4:
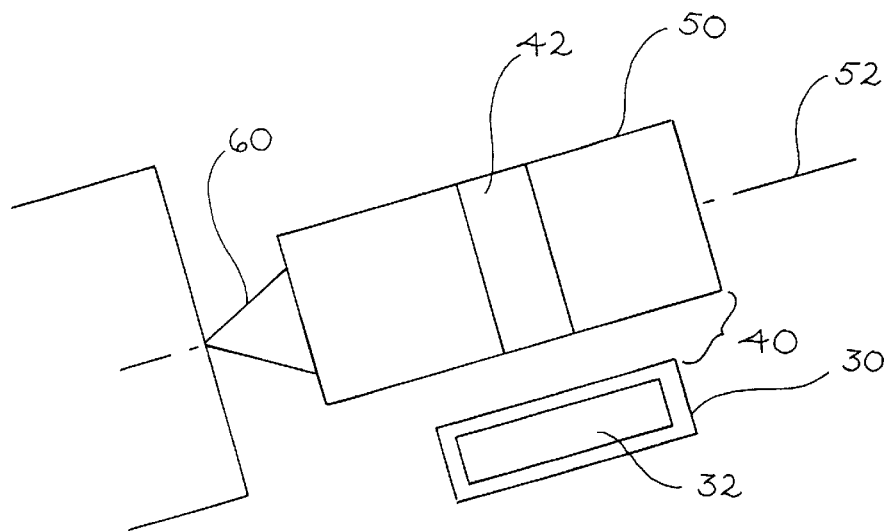
FIG. 4 shows an alternate embodiment of the system of FIG. 1.
Figure 5:
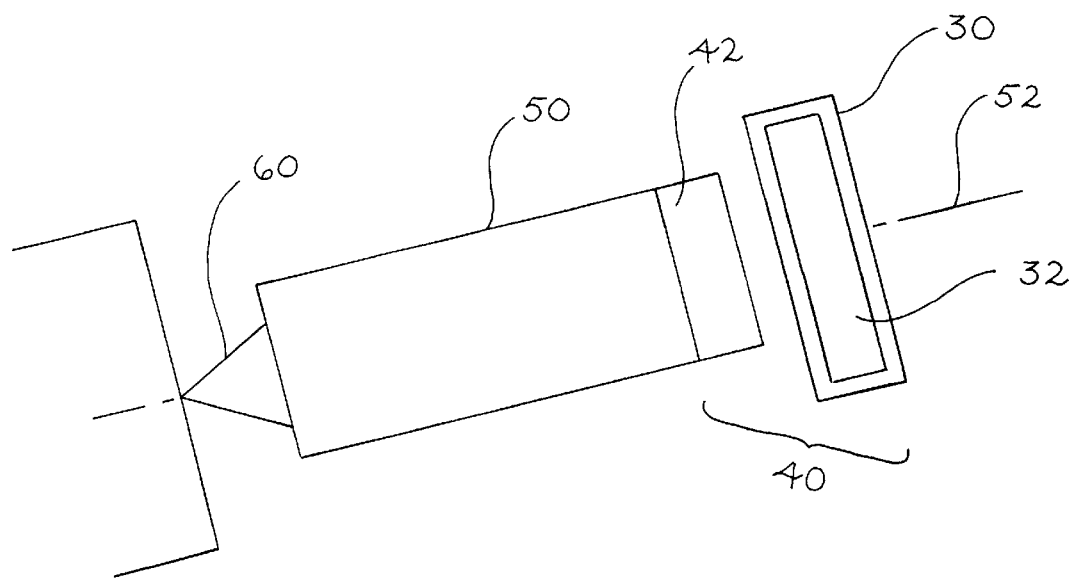
FIG. 5 shows a further alternate embodiment of the system of FIG. 1.

Referring now to FIGS. 4 and 5, according to alternate embodiments, superconductor bearing 40 can be used in conjunction with a traditional non-superconducting bearing 60. The superconductor bearing 40 can be used to stabilize rotary member 50 while non-superconducting bearing 60 is used to support rotary member 50. The superconductor bearing 40 preferably comprises a stator element 30 and a levitation element 42 as described herein. The non-superconducting bearing 60 preferably comprises magnetic bearings including permanent magnet bearings, electromagnet bearings, active bearings, passive bearings or other suitable bearings as known by those skilled in the art. Alternatively, non-superconducting bearing 60 can comprise mechanical bearings including journal bearings, thrust bearings, pin bearings, sleeve bearings, fluid bearings or any other suitable bearings as known by those skilled in the art and depicted in FIGS. 4 and 5.

As indicated herein, superconductor elements 32, 132 preferably comprise Type II high-temperature superconducting material. Generally, Type II superconductor materials have critical temperatures ($T_c$) above 30 K. Examples of Type II high-temperature superconductor materials include high-temperature superconducting oxides such as barium-lanthanum-copper oxides (Ba—La—CuO), strontium-lanthanum-cooper oxides (Sr—La—CuO), yttrium-barium-copper oxides (YBCO), mercury-based cuprates (Hg—Ba—Ca—CuO), thallium-based cuprates (Tl—Ba—Ca—CuO) and bismuth-strontium-calcium-copper oxides (BSSCO). Thus, for example, superconductor elements 32, 132 can comprise a Type II superconducting material which can selected from the group consisting essentially of $La_{1-x}Ba_xCuO_4$, $(La_{1-x})_2CuO_{4-y}$, $La_{2-x}Sr_xCuO_4$, $YBa_2Cu_3O_{7-\delta}$, $Yba_2Cu_{3.5}O_{7+x}$, $Yba_2Cu_4O_{8+x}$, $Bi_2(Sr,Ca)_{3-x}Cu_2O_{9-y}$, $Bi_2(Sr,Ca)_{3-x}Cu_2O_{9-y}$, $Bi_4(Sr,Ca)_6Cu_4O_{16+x}$, $Bi_2Sr_3Ca_3Cu_2O_{8+x}$, $Tl_2Ba_2CaCu_2O_{10+\delta}$, $Tl_2Ba_2CaCu_3O_{8+\delta}$ and $HgBa_2Ca_2Cu_3O_{6+\delta}$. Preferably, the superconductor elements 32, 132 comprise a material selected from the group consisting essentially of $La_{1.85}Ba_{0.15}CuO_4$, $La_{1.85}Sr_{0.5}CuO_4$, $Yba_2Cu_3O_7$, $Bi_2Sr_2CaCu_2O_8$, $Bi_2Sr_2Ca_2Cu_3O_{10}$, $Tl_2Ba_2CaCu_2O_8$, $Tl_2Ba_2Ca_2Cu_2O_{10}$ and $HgBa_2Ca_2Cu_3O_{6+\delta}$. Most preferably, the superconductor elements 32, 132 comprise $Yba_2Cu_3O_7$.

The preferred relative domain alignment of the superconductor elements 32, 132 is one in which at least one domain C-axis vector is angularly disposed relative to rotation axis 52, 152. This domain alignment enhances rotor stability. Further details of the preferred relative alignment can be found in U.S. patent application Ser. No. 08/483,458 filed Jun. 7, 1996, now U.S. Pat. No. 5,747,426, which is incorporated herein by reference and is also assigned to the assignee of the present invention.

Levitating element 42, 142 may alternatively comprise a superconducting magnetic material in addition to the permanent magnet material. Rotary member 50, 150 may comprise any conventional configuration of a rotary element in a thrust bearing system. Typically, rotary member 50, 150 is cylindrical or disc-shaped. Alternatively, rotary member 50, 150 can comprise any form of rotor adapted for use in a high speed energy storage system as known by those skilled in the art.

The superconductor elements 32, 132 are preferably housed in a cooling chamber 34, 134 that is preferably maintained at the operating temperature (i.e., below $T_c$) of the superconductor elements 32, 132. When the superconductor elements 32, 132 comprise Type II superconductors, a source (not shown) containing liquid nitrogen ($LN_2$) can be used to maintain the cooling chamber 34, 134 at the operating temperature of the superconductor elements 32, 132. Alternatively, a self-contained cryo-cooler, including a cold head, as known by those skilled in the art, can be used to cool the superconducting elements 32, 132 in cooling chamber 34, 134. Additionally, any suitable cooling apparatus can be adapted to cool superconductor elements 32, 132 of the present embodiments, as known by those skilled in the art.

While the illustrated embodiments show the superconductor bearing 40 in a thrust configuration, it is understood that the superconductor bearing 40 can comprise a thrust configuration, a journal configuration or other suitable configurations as known by those skilled in the art.

As previously stated, tilt angle 70, 170 preferably comprises the angle between rotation axis 52, 152 relative to the direction of gravity 78, 178. Preferably, vertically adjustable leg 22, 122 is adjusted to create a tilt angle 70, 170 that is sufficient to allow the force of gravity acting on any heavy side of rotary member 50, 150 to rotate rotary member 50, 150 such that the imbalanced portion 58, 158 is at the lowest point possible. This orientation represents the lowest potential energy state of rotary member 50, 150.

The specific value of the tilt angle 70, 170 is not critical to the present embodiments. A slight tilt angle 70, 170 may be sufficient to allow the force of gravity acting on the imbalanced portion 58, 158 of the rotary member 50, 150 to rotate rotary member 50, 150 such that the imbalanced portion 58, 158 is at the lowest potential energy position for the suspended rotary member 50, 150. Preferably, tilt angle 70, 170 has a value of between 15 and 45 degrees for the configuration shown in FIG. 1. More preferably, the tilt angle 70, 170 has a value of between 80 and 90 degrees when a system incorporating journal bearings is used to balance rotary member 50, 150.

The exact levitation height 72, 172 of the rotary member 50, 150 is not critical to the present embodiments, so long as the levitation height 72, 172 allows for sufficient clearance of rotary member 50, 150. Sufficient clearance of rotary member 50, 150 allows it to freely rotate while it is suspended over stator element 30, 130.

In accordance with a method of the presently preferred embodiment, rotary member 50, 150 is coupled with the magnetic elements 43, 143. Rotary member 50, 150 and magnetic elements 43, 143 are positioned at a predetermined height above the stator element 30, 130. The superconductor elements 32, 132 are activated through field cooling as known by those skilled in the art. Rotary member 50, 150 is suspended above stator element 30, 130 by the repulsive force between superconductor elements 32, 132 and magnet elements 43, 143 a result of the activation of the superconductor elements 32, 132. This activation allows the rotary member 50, 150 to be freely rotated about the rotation axis 52, 152. The suspended rotary element 50, 150 is then tilted to a tilt angle 70, 170 preferably through the use of vertically adjustable leg 22, 122. The tilt angle 70, 72, in this example, comprises the angle between rotation axis 52, 152 relative to the direction of gravity 78, 178.

Any imbalanced portion or heavy spot, on the rotary member 50, 150 can be identified and located when the rotary member 50, 150 is in its tilted position. The force of gravity acts on the rotary member 50, 150 thereby causing rotary member 50, 150 to rotate. The imbalanced portion 58, 158 is preferably identified as the lowest portion of the rotary member 50, 150, after the rotary member 50, 150 has rotated and come to rest. After the imbalanced portion 58, 158 is located on the rotary member 50, 150 it can be compensated by adding or removing test weights (not shown) at the balance compensation portion 80, 180 of the rotary member 50, 150. The balance compensation portion 80, 180 of the rotary member 50, 150 preferably comprises one or more points opposite the imbalanced portion 58, 158.

In a further preferred method of the present embodiment, the imbalanced portion 58, 158 is further identified by recording the rotational orientation of the rotary member 50, 150 after is comes to rest a first time. After the rotary member 50, 150 comes to rest the first time, the rotary member 50, 150 is preferably rotated 180 degrees from its position when it came to rest the first time. The rotary member 50, 150 is again allowed to come to rest at a second position. The orientation of the rotary member 50, 150 can again be recorded and the lowest position is preferably identified as the imbalanced portion 58, 158 of the rotary member 50, 150.

In a preferred method of the present embodiment, the rotary member 50, 150 can be equipped with azimuthal marks orthogonal to the rotation axis 52, 152, to identify the orientation of the rotary member 50, 150 during the balancing process. These markings serve to further assist in the identification of the lowest potential energy position of the rotary member 50, 150. A stationary reference point is preferably used in conjunction with the azimuthal markings to further assist in the identification of the lowest potential energy position of the rotary member 50, 150.

Once an imbalanced portion 58, 158 is located, it can be compensated at a balance compensation point 80, 180 opposite the imbalanced portion 58, 158. For example, at least one test weight (not shown) may be placed at the balance compensation portion 80, 180. Alternatively, at least one test weight may be removed from the balance compensation portion 80, 180. The imbalanced portion 58, 158 is compensated so that it no longer rests at the lowest level of potential energy, except by coincidence.

In a further preferred embodiment, the value of an imbalance moment caused by imbalance in the rotary member 50, 150 can be determined by attaching a test mass of a known value at a known radius opposite the identified imbalanced portion 58, 158 of the rotary member 50, 150, as described herein. The process for identifying imbalance, as described above, can be repeated to determine whether any imbalance exists. If imbalance does exist, the radial location of the test mass can be changed or the value of the test mass can be changed. After one or more changes have been made, the process described above can be repeated until the rotary member 50, 150 is sufficiently balanced. After the rotary member 50, 150 is balanced, the imbalance moment can be calculated by multiplying the value of the test mass and the radial position of the test mass.

In a preferred embodiment of the system and method, the levitating element 42, 142 and the bracket 44 are balanced prior to coupling with the rotary member 50, 150 as known by those skilled in the art.

Of course, it should be understood that a wide range of changes and modifications can be made to the preferred embodiment described above. It therefore is intended that the foregoing detailed description be regarded as illustrative rather than limiting and that it be understood that it is the following claims, including all equivalents, which are intended to define the scope of this invention.

I claim:

1. A method for locating imbalance in a rotary member having a rotation axis, the method comprising the steps of:
   providing a superconductor bearing comprising a stator element and a levitating element, the levitating element coupled with the rotary member;
   activating the superconductor bearing such that the levitating element is suspended with respect to the stator element and the rotary element can rotate about the rotation axis;
   positioning the rotary member such that the rotation axis is non-parallel with a gravity direction; and
   locating any imbalanced portion in said rotary member.

2. The method of claim 1, wherein the step of locating any imbalanced portion comprises the steps of:
   identifying a first lowest point on the rotary member when the rotary member comes to rest in a first position;
   rotationally disposing the rotary member from the first position; and
   identifying a second lowest point on the rotary member when the rotary member comes to rest.

3. The method of claims 1 or 2, further comprising the step of compensating the imbalanced portion.

4. The method of claim 3, wherein the imbalanced portion is compensated by placing a compensating weight at a point on said rotary member opposite said imbalanced portion.

5. The method of claim 3, wherein the step of compensating the imbalanced portion comprises eliminating a portion of the imbalanced portion.

6. The method of claim 1, wherein the stator element comprises a superconductor element and the levitation element comprises at least one magnet.

7. The method of claim 1, wherein the stator element comprises at least one magnet and the levitation element comprises a superconductor element.

8. The method of claims 6 or 7 wherein the superconductor element comprises a high-temperature superconductor element.

9. The method of claim 1, wherein the rotary member comprises a rotor adapted for use in an energy storage system.

10. The method of claim 1, wherein the stator assembly and the at least one magnetic element are components of an assembly in which the rotary member normally operates.

11. A method for identifying imbalance in a rotary member having a rotation axis, the method comprising the steps of:
    providing at least one magnet coupled with the rotary member;
    providing a stator element comprising a superconductor element, the stator element configured to suspend the at least one magnet;
    activating the stator element such that the at least one magnet is suspended with respect to the stator element and the rotary element can rotate about the rotation axis;
    positioning the rotary member such that the rotation axis is non-parallel with a gravity direction; and
    identifying any imbalanced portion in said rotary member when the rotary member comes to rest.

12. The method of claim 11, wherein the step of identifying the imbalance, when the rotary member comes to rest comprises the steps of:
    identifying a first lowest point when the rotary member comes to rest in a first position;
    rotationally disposing the rotating the rotary from the first position; and
    identifying a second lowest point on the rotary member when the rotary member comes to rest.

13. A system for balancing a rotary member having a rotation axis, the system comprising:
    a superconductor bearing comprising a stator assembly and a levitating element, the levitating element coupled with the rotary member;
    a balancer stand coupled with the stator assembly, the balancer stand operable to position the rotary member such that the rotation axis is non-parallel with a direction of gravity.

14. The system of claim 13, wherein the stator assembly comprises a superconductor element and the levitating element comprises a magnet.

15. The system of claim 13, wherein the stator assembly comprises a magnet and the levitating element comprises a superconductor element.

16. The system of claims 14 or 15, wherein the superconductor element comprises a high temperature superconductor element.

17. The system of claim 16, wherein the high temperature superconductor element comprises a Type II high-temperature superconductor element.

18. The system of claim 13, wherein stator assembly and the levitating element are relatively disposed in a thrust bearing configuration.

19. The system of claim 13, wherein the stator assembly and the levitating element are relatively disposed in a journal bearing configuration.

20. The system of claim 13, wherein the rotary member comprises a rotor adapted for use in an energy storage system.

21. The system of claim 13, further comprising a non-superconducting bearing for supporting the rotary member.

22. A system for balancing a rotary member having a rotation axis, the apparatus comprising:
    a stator assembly comprising a superconductor element;
    a magnet coupled with the rotary member;
    a balancer stand coupled with the stator assembly, the balancer stand operable to create a tilt angle between the rotation axis and a direction of gravity.

23. A system for balancing a rotary member having a rotation axis, the system comprising:
    a superconductor bearing comprising a stator assembly and a levitating element, the levitating element coupled with the rotary member;
    means for creating a tilt angle between the rotation axis and a direction of gravity.

24. A method for locating imbalance in a rotary member having a rotation axis, the method comprising the steps of:
    providing a superconductor bearing comprising a stator element and a levitating element, the levitating element coupled with the rotary member;
    supporting the rotary member with a non-superconducting bearing;
    activating the superconductor bearing such that the levitating element is suspended with respect to the stator element and the rotary element can rotate about the rotation axis;

positioning the rotary member such that the rotation axis is non-parallel with a gravity direction; and locating any imbalanced portion in said rotary member.

25. The method of claim 24, further comprising the step of compensating the imbalanced portion.

26. The method of claim 24, wherein the stator element comprises a superconductor element and the levitation element comprises at least one magnet.

27. The method of claim 25, wherein the stator element comprises at least one magnet and the levitation element comprises a superconductor element.

28. The method of claims 26 or 27 wherein the superconductor element comprises a high-temperature superconductor element.

* * * * *

UNITED STATES PATENT AND TRADEMARK OFFICE
CERTIFICATE OF CORRECTION

PATENT NO. : 5,939,629
DATED : August 17, 1999
INVENTOR(S) : Robert G. Abboud

It is certified that error appears in the above-identified patent and that said Letters Patent is hereby corrected as shown below:

In claim 12, line 6, please change "the rotating the rotary from" to --the rotary member from--.

Signed and Sealed this

Tenth Day of April, 2001

Attest:

NICHOLAS P. GODICI

*Attesting Officer*    *Acting Director of the United States Patent and Trademark Office*